Nov. 13, 1923.

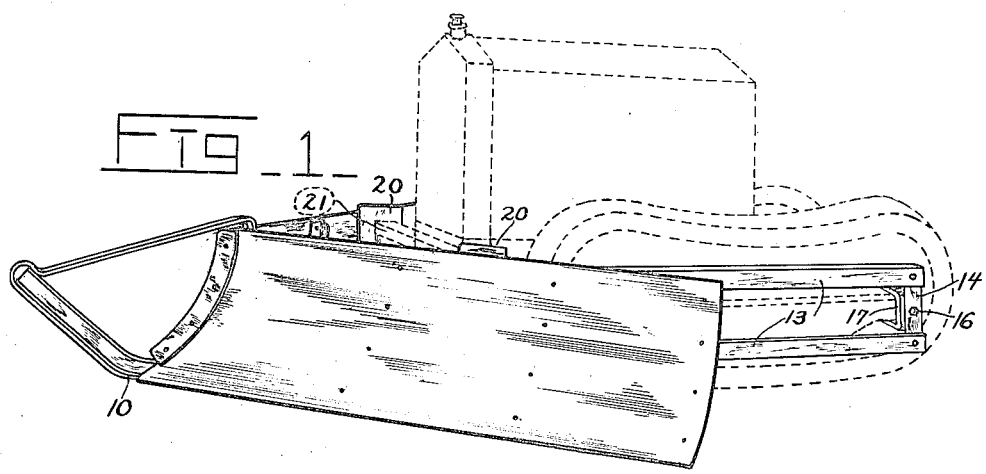
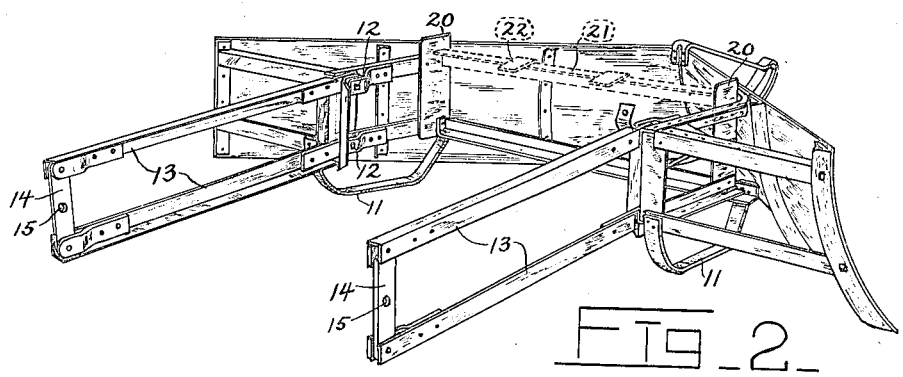
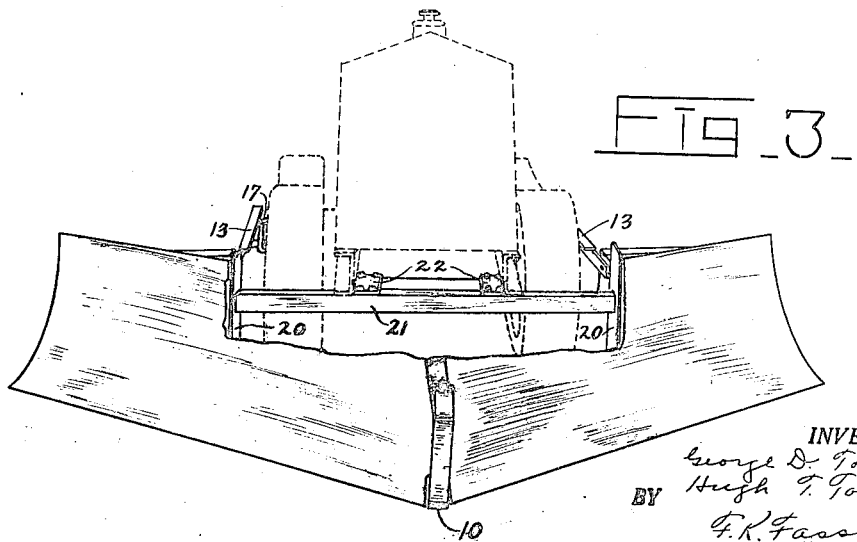

G. D. TOY ET AL 1,473,889

DRIVING GEAR FOR SNOWPLOWS

Filed Aug. 28, 1922

INVENTORS,
George D. Toy, and
Hugh F. Toy.
BY F. K. Fassett
ATTORNEY.

Patented Nov. 13, 1923.

1,473,889

UNITED STATES PATENT OFFICE.

GEORGE D. TOY AND HUGH T. TOY, OF SIDNEY, OHIO.

DRIVING GEAR FOR SNOWPLOWS.

Application filed August 28, 1922. Serial No. 584,930.

*To all whom it may concern:*

Be it known that we, GEORGE D. TOY and HUGH T. TOY, citizens of the United States, residing at Sidney, in the county of Shelby and State of Ohio, have jointly invented new and useful Improvements in Driving Gears for Snowplows, of which the following is a specification.

Our invention relates to driving gear whereby a snow plow may be coupled to a tractor and driven, affording the plow the utmost proper freedom of movement while giving the tractor driver complete control of the plow and tractor.

A better appreciation of the objects and advantages of our invention will be obtainable after its construction and operation have been described, so we shall proceed at once with the description, referring to the accompanying drawings, in which—

Figure 1 is a perspective view of a plow attached to a tractor by our device, the tractor being shown with dotted lines;

Figure 2 is a perspective view of the plow detached from the tractor and seen from the rear;

Figure 3 is a front view of the plow and tractor, showing the means for guiding the up and down movements of the plow and preventing lateral movement of the plow with reference to the tractor;

Figure 4:
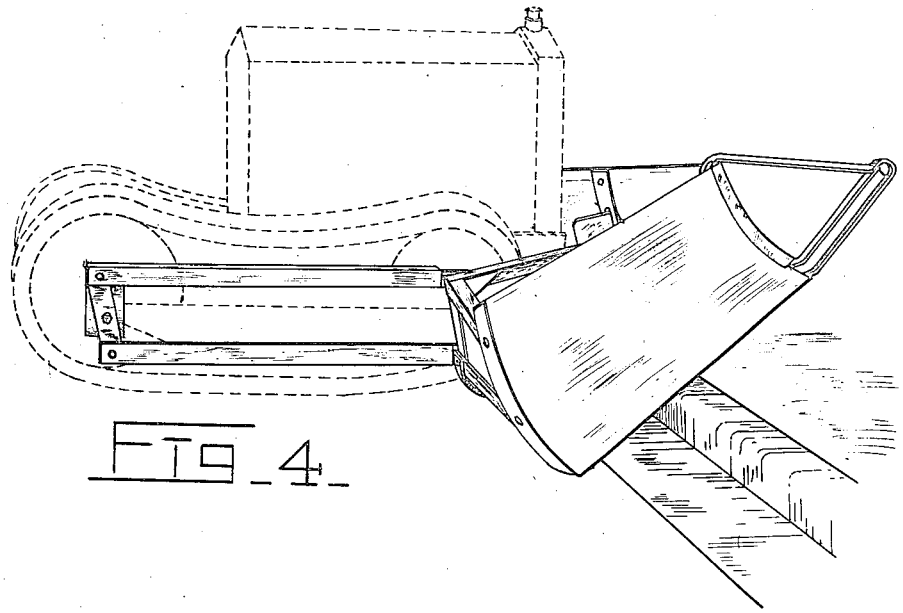
Figures 4 and 5 show the apparatus in action, indicating the great flexibility of the device.

As we are making no claims here to the plow structure, it is not necessary to describe the plow in detail. It suffices to say that the plow is provided with a runner 10 at its apex, and two runners 11 at the rear, which slide on the snow or the ground and carry the plow in a level position with its lower edge raised slightly above the ground. Pivotally attached at 12—12 of the plow frame are driving bars 13, there being a pair of these bars at each side, the free ends of each pair of bars being pivotally connected to a yoke 14, each yoke having at its center a hole 15. We prefer to attach these yokes to the tractor by bolts 16, whose axes coincide with the axes of the rear driving wheels of the tractor. For the purpose of carrying the bolts 16 we bolt members 17 to the journal boxes (not shown). Secured to the frame of the plow are rubbing plates or guides, 20, and to the tractor we attach a bar 21, whose length is but slightly less than the distance between the plates 20. The purpose of these plates and the bar is to prevent lateral movement of the plow, with reference to the tractor, while leaving the plow complete freedom of movement up and down. The bar 21 is secured to the tractor frame by plates 22 and bolts, as is clearly seen in Figure 3. In Figure 2 the bar and plates are shown with dotted lines, showing the relative position of the bar and guide plates 20.

Figure 5:
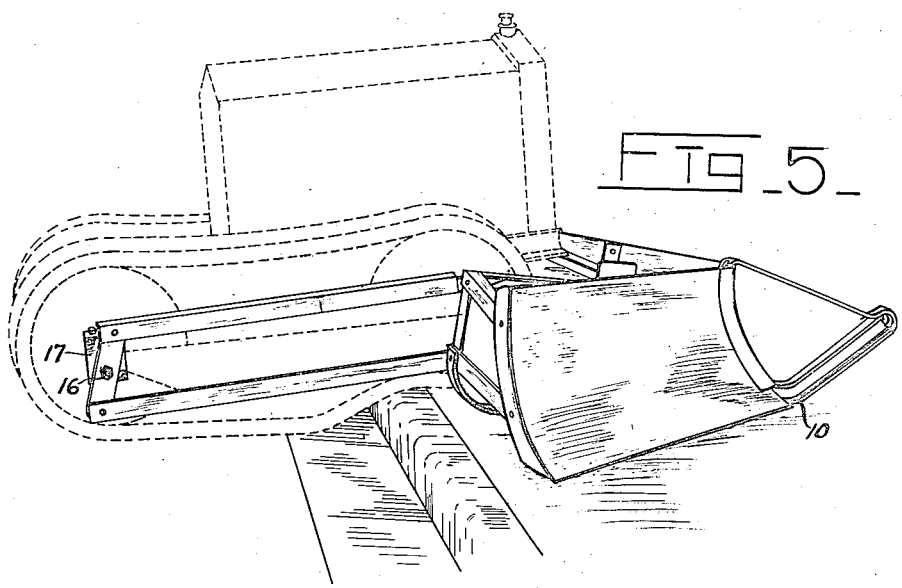

By reference to Figures 1, 3, 4 and 5, various phases of the operation of our driving device will be readily understood. On level ground the driving bars are substantially horizontal. Figure 4 shows the plow being driven over a curb, and Figure 5 shows the plow on the ground behind the curb, on a level higher than the street on which the tractor stands. These two figures show how the yoke accomodates itself to the position of the plow, always equalizing the pushing pressure on the driving bars. The driving bars are always parallel to each other and usually parallel to the ground. The guides, plates 20 and bar 21, being located at about the center of the plow, are enabled to guide the plow and prevent its displacement laterally, while sustaining the minimum of strain. The bar 21 may be kept in place on the tractor, at least throughout the winter, and all that is necessary to attach the plow, or detach it, is to put in or remove the two screws 16.

While we have disclosed the preferred embodiment of our invention we do not limit ourselves to the particular structure shown, as the structure is susceptible to modifications while remaining within the scope of our invention. What we claim as our invention and desire to protect by Letters Patent is as follows:

1. Driving gear for a snow plow, comprising driving bars pivotally connected to the plow and to a tractor, and rubbing plates on the plow adapted to bear against abutments on the tractor, whereby to prevent lateral displacement of the plow while permitting free movement of the plow up and down with reference to the tractor, said bars constituting the sole driving connection between the plow and tractor.

2. Driving gear for a snow plow, comprising a pair of driving bars pivotally connected to each side of the plow, the free ends of each pair of bars being pivotally connected to a yoke of such length as to make the driving bars substantially parallel, one of said equalizer bars being pivotally connected to each side of a tractor.

3. Driving gear for a snow plow, comprising a pair of driving bars pivotally connected to each side of the plow, the free ends of each pair of bars being pivotally connected to a yoke of such length as to make the driving bars substantially parallel, one of said equalizer bars being pivotally connected to each side of a tractor, and rubbing plates on the plow adapted to bear against abutments on the tractor, whereby to prevent lateral displacement of the plow with reference to the tractor, while permitting the plow freedom of movement with reference to the tractor in other respects.

4. Driving gear for a snow plow, comprising a pair of driving bars pivotally connected to each side of the plow, one bar above the other, and a yoke uniting the free ends of said bars by pivotal connections, thereby permitting free movement of the bars either up or down with reference to the tractor while maintaining the parallelism of the links; and means for pivotally attaching said yoke to a tractor, the pivotal connection being midway between the driving bars.

5. Driving gear for a snow plow, comprising a pair of driving bars pivotally connected to each side of the plow, one bar above the other, and a yoke uniting the free ends of said bars by pivotal connections, thereby permitting free movement of the bars either up or down with reference to the tractor while maintaining the parallelism of the links; and means for pivotally attaching said yokes to a tractor with the axes of said connections substantially coincident with that of the tractor wheels.

6. Driving gear for a snow plow, comprising a pair of driving bars pivotally connected to each side of the plow, one above the other and a yoke uniting the free ends of said bars by pivotal connections, thereby permitting free movement of the bars either up or down with reference to the tractor while maintaining the parallelism of the links; means for pivotally attaching said yoke to a tractor, and a guide whereby lateral motion of the plow with reference to the tractor is prevented, while permitting complete freedom of movement of the plow up and down with reference to the tractor.

7. Driving gear for a snow plow, comprising driving bars pivotally connected to the plow and to a tractor, said pivotal connections being so located, relatively, that when the tractor and plow are on the same level the bars will be substantially horizontal, said bars constituting the sole driving connection between the tractor and plow, and rubbing plates on the plow adapted to cooperate with abutments on the tractor to prevent lateral displacement of the plow while permitting freedom of movement of the plow with reference to the tractor in other directions.

8. Driving gear for a snow plow, comprising driving bars pivotally connected to the plow and to a tractor, said bars being the sole driving connection between the tractor and plow, and means comprising a member carried by the tractor, but remote from said pivotal connection, for preventing lateral movement of the plow with reference to the tractor, while allowing it full freedom of movement in other directions.

9. Driving gear for a snow plow, comprising driving bars pivotally connected to the plow and to a tractor, said pivotal connections being so located, relatively, that when the tractor and plow are on the same level the bars will be substantially horizontal, the plow being located in front of the tractor while the bars are connected to the tractor near its rear end, thereby insuring that the bars shall be of sufficient length to deviate but little from horizontality although the ground over which the plow is pushed be unlevel, and rubbing plates on the plow adapted to cooperate with abutments on the tractor to prevent lateral displacement of the plow while permitting entire freedom of movement of the plow with reference to the tractor in other directions.

GEORGE D. TOY.
HUGH T. TOY.